(12) United States Patent
Liao et al.

(10) Patent No.: US 6,507,338 B1
(45) Date of Patent: Jan. 14, 2003

(54) COMPUTER SYSTEM HAVING A CONFIGURABLE TOUCHPAD-MOUSE BUTTON COMBINATION

(75) Inventors: Reynold Liao, Austin, TX (US); Sean O'Neal, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/661,645

(22) Filed: Sep. 13, 2000

Related U.S. Application Data

(62) Division of application No. 09/133,915, filed on Aug. 13, 1998, now Pat. No. 6,392,637.

(51) Int. Cl.[7] .............................................. G06F 15/00
(52) U.S. Cl. ........................ 345/173; 345/156; 345/157
(58) Field of Search ................................ 345/173, 156, 345/157

(56) References Cited

U.S. PATENT DOCUMENTS

| | | | |
|---|---|---|---|
| 4,837,511 A | * | 6/1989 | Whittington et al. ....... 324/204 |
| 4,988,982 A | * | 1/1991 | Rayner et al. .............. 345/173 |
| 5,241,308 A | | 8/1993 | Young |
| 5,469,194 A | | 11/1995 | Clark et al. |
| 5,577,848 A | | 11/1996 | Bowen |
| 5,864,105 A | * | 1/1999 | Andrews ..................... 200/5 R |
| 5,875,311 A | * | 2/1999 | Bertram et al. ............. 710/129 |
| 5,917,906 A | * | 6/1999 | Thornton .................... 379/433 |
| 5,942,733 A | * | 8/1999 | Allen et al. ............. 178/18.01 |
| 5,988,902 A | * | 11/1999 | Holehan .................. 400/479.1 |
| 6,073,341 A | * | 6/2000 | Odorfer ...................... 200/5 A |
| 6,085,576 A | * | 7/2000 | Sunshine et al. .......... 73/29.01 |

* cited by examiner

*Primary Examiner*—Bipin Shalwala
*Assistant Examiner*—Vincent E. Kovalick
(74) *Attorney, Agent, or Firm*—Haynes and Boone, LLP

(57) ABSTRACT

A computer touchpad includes a first portion usable for button functions to select items on a computer display panel. A second portion of the touchpad is usable for cursor movement and placement functions. An overlay member is detachably mounted on the touchpad. The overlay member includes a first part and a second part. The first part of the overlay member includes several defined sections and the second part of the overlay member includes a single defined section. The first part of the overlay member mounts on the first portion of the touchpad and the second part of the overlay member mounts on the second portion of the touchpad.

4 Claims, 5 Drawing Sheets

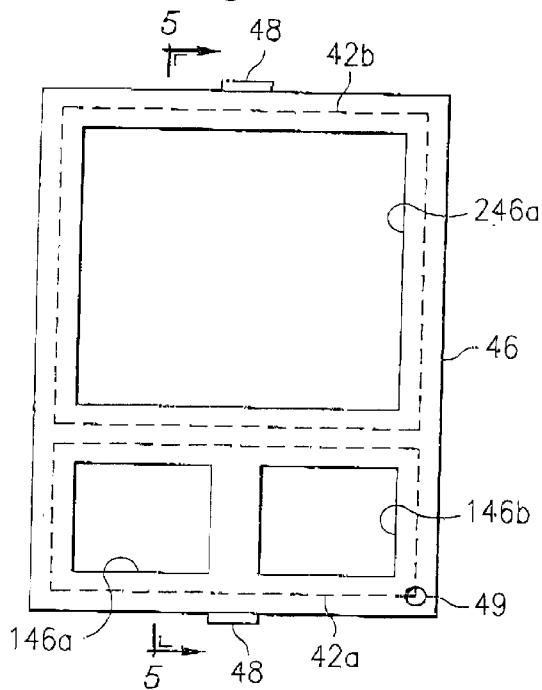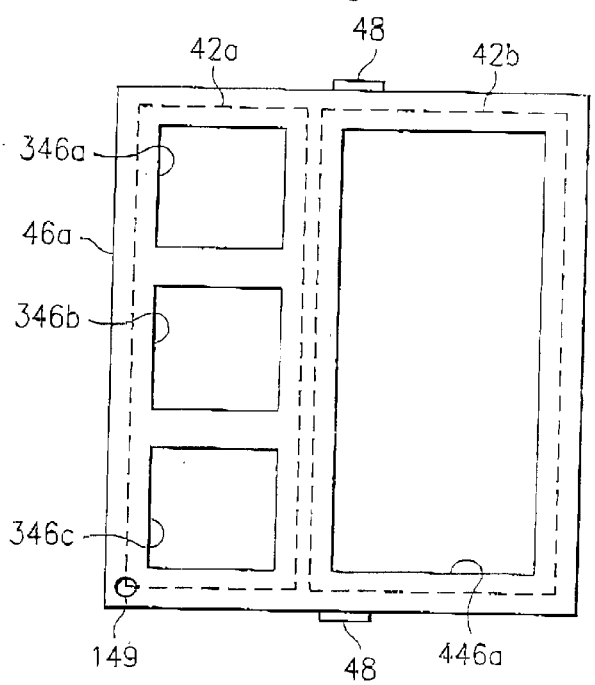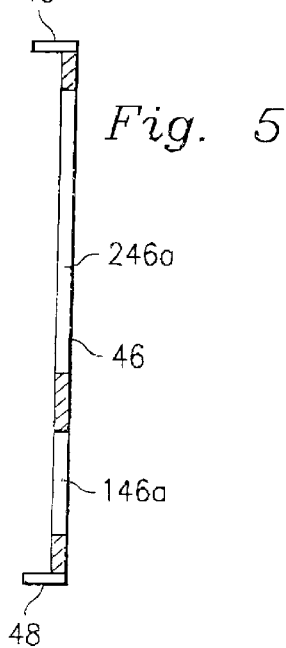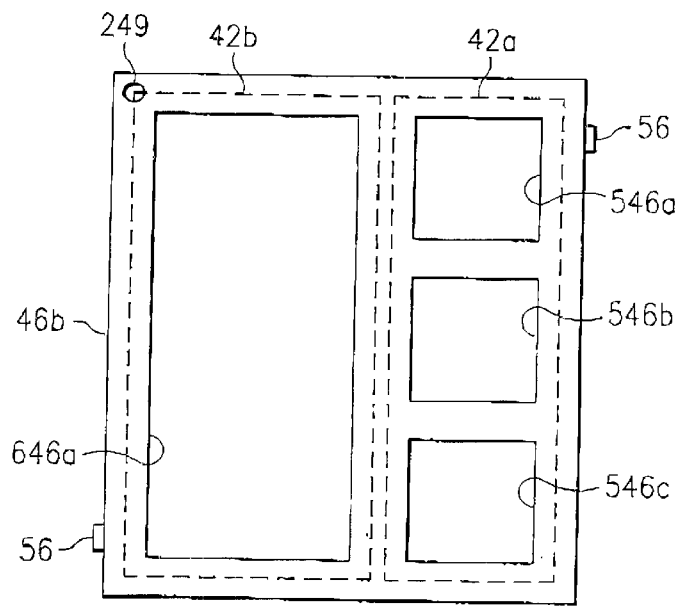

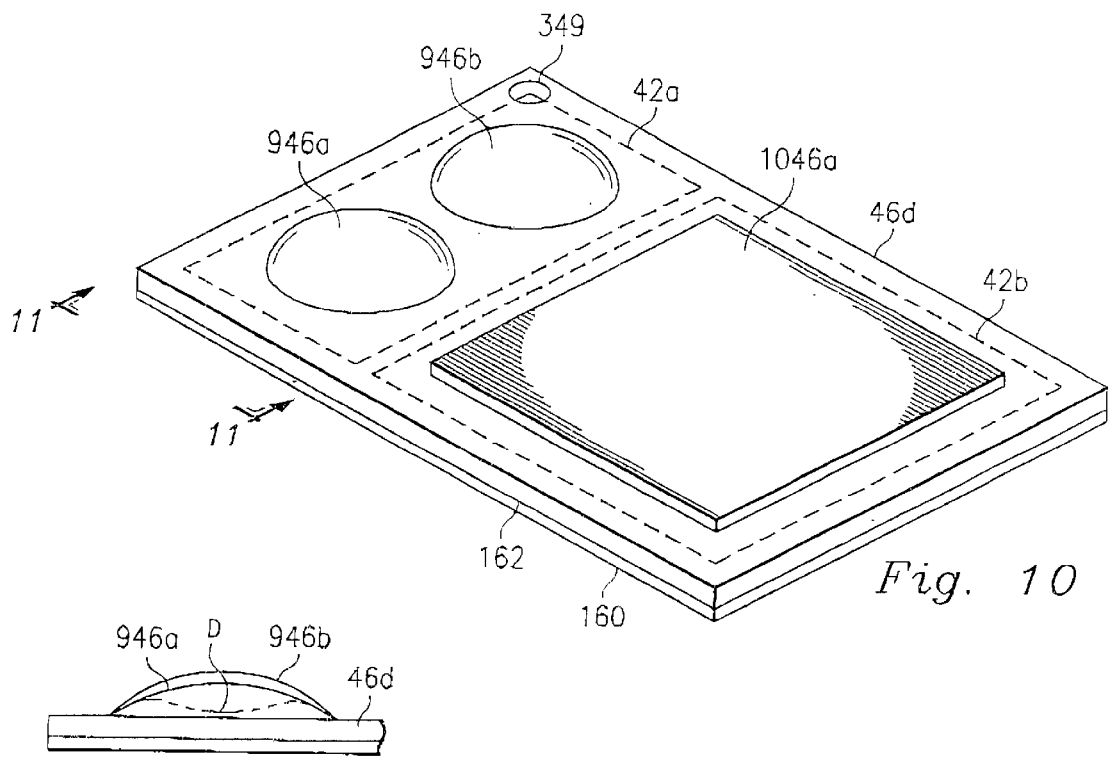
Fig. 10
Fig. 11
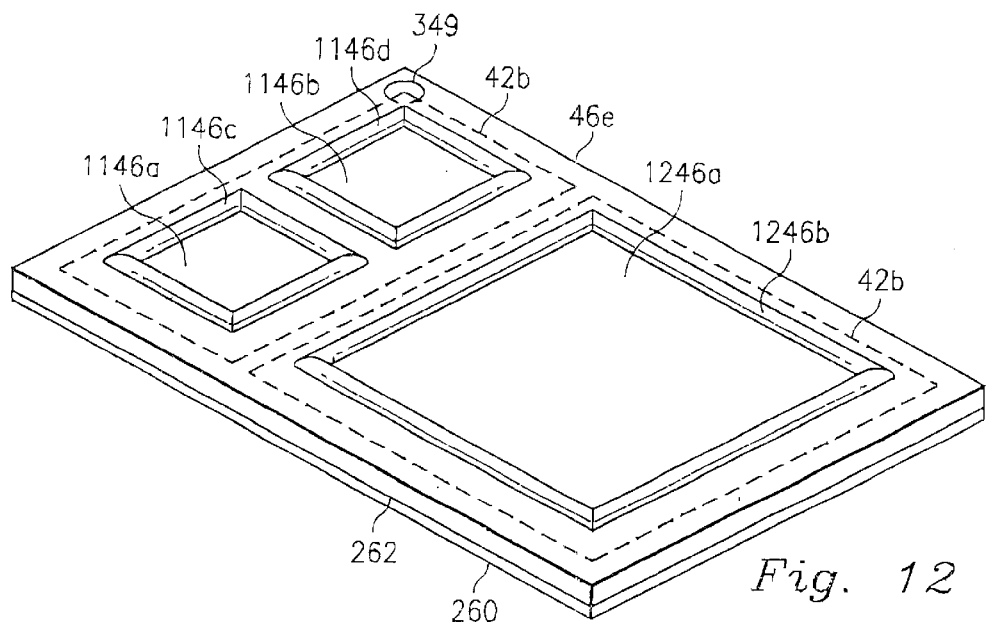
Fig. 12

COMPUTER SYSTEM HAVING A CONFIGURABLE TOUCHPAD-MOUSE BUTTON COMBINATION

This application is a divisional of U.S. Ser. No. 09/133,915 filed Aug. 13, 1998 now U.S. Pat. No. 6,392,637.

BACKGROUND

The disclosures herein relate generally to computer systems and more particularly to a configurable touchpad-mouse button combination for a portable computer.

Portable, battery-powered computers are popular due to their light weight and small size that permits them to be easily hand-carried in an ordinary briefcase and used by business travelers in cramped spaces, such as on airline seat back trays, lacking electrical plug-in facilities. Portable computers are often referred to as laptop, notebook, or subnotebook computers. These computers typically include a base portion and a pivotally attached lid portion. A flat panel display such as a liquid crystal display (LCD) or other relatively small display is provided in the lid portion. The portable computer also incorporates both a hard and floppy disc drives, and a keyboard built into its base portion. It is a fully self-contained computer system able to be conveniently used, for at least short periods of time, in situations and locations in which the use of a much larger desktop computer is not feasible.

Various input devices are used to facilitate the human interaction with these computer systems. In the past, the primary input device simply consisted of the keyboard. The human operator or user entered data by typing on alphanumeric, special function, and arrow keys from the keyboard. The entered data was usually displayed on the LCD display.

Subsequently, a more sophisticated and user-friendly interface encompassing the use of a cursor to perform editing and selection functions was developed. Typically, an input device coupled to the computer system is manipulated by the user to control the movement of a cursor on the display. One or more buttons are used to perform the desired selection functions. For example, a user can place a cursor over an icon displayed on the display monitor. The icon can then be selected by clicking the button. This "point-and-click" feature has proven to be extremely popular and has gained wide acceptance.

There are several different types of input devices for controlling the cursor that are commercially available today. Some of these types include a mouse, a trackball, a joystick, a writing pen, and a stylus tablet, to name a few. The latest cursor controlling device for a computer system is the touchpad or trackpad. One type of touchpad uses field-distortion or capacitive sensing technology. Two layers of electrodes are arranged in a grid on the pad's flat planar surface to create an electrical field. Finger movement on the touchpad distorts the electrical field allowing the cursor movement to be controlled by the touch of a finger. The user moves the cursor or arrow on their computer display by gliding a finger across the touchpad. To select items or launch applications, the user lightly taps the touch pad surface once or twice, similar to pushing the buttons on a mouse. Touchpads require less space than a mouse, therefore, they are more suitable for portable computers than a mouse. Touchpads are superior to trackballs in that they contain no moving parts and they do not get clogged or gummed up with dirt.

One problem with touchpads is they require a wider range of finger motion to operate than a trackball. A trackball requires a minimal amount of finger movement, approximately a ¼ of an inch circle around the device. With a touchpad however, the user is required to incorporate the full width and length of the pad, approximately 1½ to 2 inches, to move the cursor. Examples of touchpad and touch panel applications are disclosed in U.S. Pat. No. 5,241,308 and U.S. Pat. No. 5,577,848.

Another way to advantageously make a touchpad adjustable is to allow a user to orient the touchpad in variety of ways with respect to the computer system. Because touchpads are not symmetrically global, certain orientations of the touchpad are more convenient for users with different typing styles. It is known that a computer system is able to detect an orientation of a touchpad in a computer system and adjust the cursor control movements according to the orientation. Clark et al., U.S. Pat. No. 5,469,194, teaches one method of compensating for a physical orientation of a touchpad relative to the display screen. This method allows for a horizontal movement on the touchpad operating surface to cause a horizontal movement of the cursor independent of which orientation is used.

In some portable computers the pointing device and input device typically include a touchpad and two push buttons. This built-in configuration is sometimes constraining. That is, if a customer requests a touchpad with three buttons, the notebook computer must be redesigned mechanically and electronically.

Cost is also a factor. Using conventional mouse buttons, several parts are required. Some of those parts include molded plastic buttons, a button board mounted under the buttons, and a cable connecting the button board to the motherboard. The more parts that are required, the more chances of failure exist. Also, more parts increase original costs, maintenance costs, and require increased inventory maintenance and management.

Therefore, what is needed is a configurable touchpad area for a portable computer including portions of the touchpad which are sectioned off for use as buttons. A portion of the touchpad area would provide a mouse-like function for finger movement to move a cursor or arrow on the computer LCD display. Another portion of the touchpad area would function as push buttons and could be configurable for a two or three button arrangement. The physical sectioning of the touchpad area could be accomplished either mechanically or graphically.

SUMMARY

One embodiment, accordingly, provides a re-configurable touchpad-mouse button combination for a portable computer. The touchpad and buttons may be rearranged and configured by a user within a range of versions manufactured into the computer or programmable into the computer by the user. To this end, a touchpad overlay includes an overlay member for mounting on a touchpad, the overlay member including a first part and a second part. The first part of the overlay member includes a plurality of defined sections and the second part of the overlay member includes a single defined section. Means are provided for detachably mounting the overlay member on the touchpad.

A principal advantage of this embodiment is that the user may select a configuration and/or use various configurations selectively to satisfy functional and personal preferences. With this arrangement, it would be easier to accommodate right and left-handed users. In addition, the use of interchangeable configurations will cut back on the amount of parts required, thus reducing costs and increasing reliability.

BRIEF DESCRIPTION OF THE DRAWINGS

FIG. 4 is a plan view illustrating an embodiment of a touchpad overlay.

FIG. 5 is a side view of the touchpad overlay taken along line 5—5 of FIG. 4.

FIG. 6 is a plan view illustrating another embodiment of a touchpad overlay.

FIG. 7 is a plan view illustrating still another embodiment of a touchpad overlay.

FIG. 10 is an isometric view illustrating a further embodiment of a touchpad overlay.

FIG. 11 is a partial side view of the touchpad overlay taken along the line 11—11 of FIG. 10.

FIG. 12 is an isometric view illustrating a further embodiment of a touchpad overlay.

DETAILED DESCRIPTION OF THE PREFERRED EMBODIMENT

Figure 1:
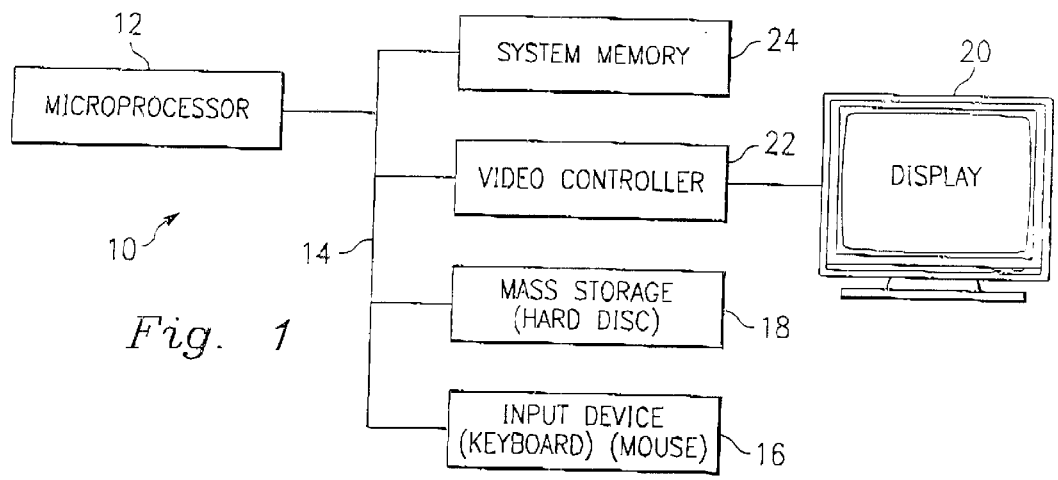
FIG. 1 is a diagrammatic view illustrating an embodiment of a typical computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
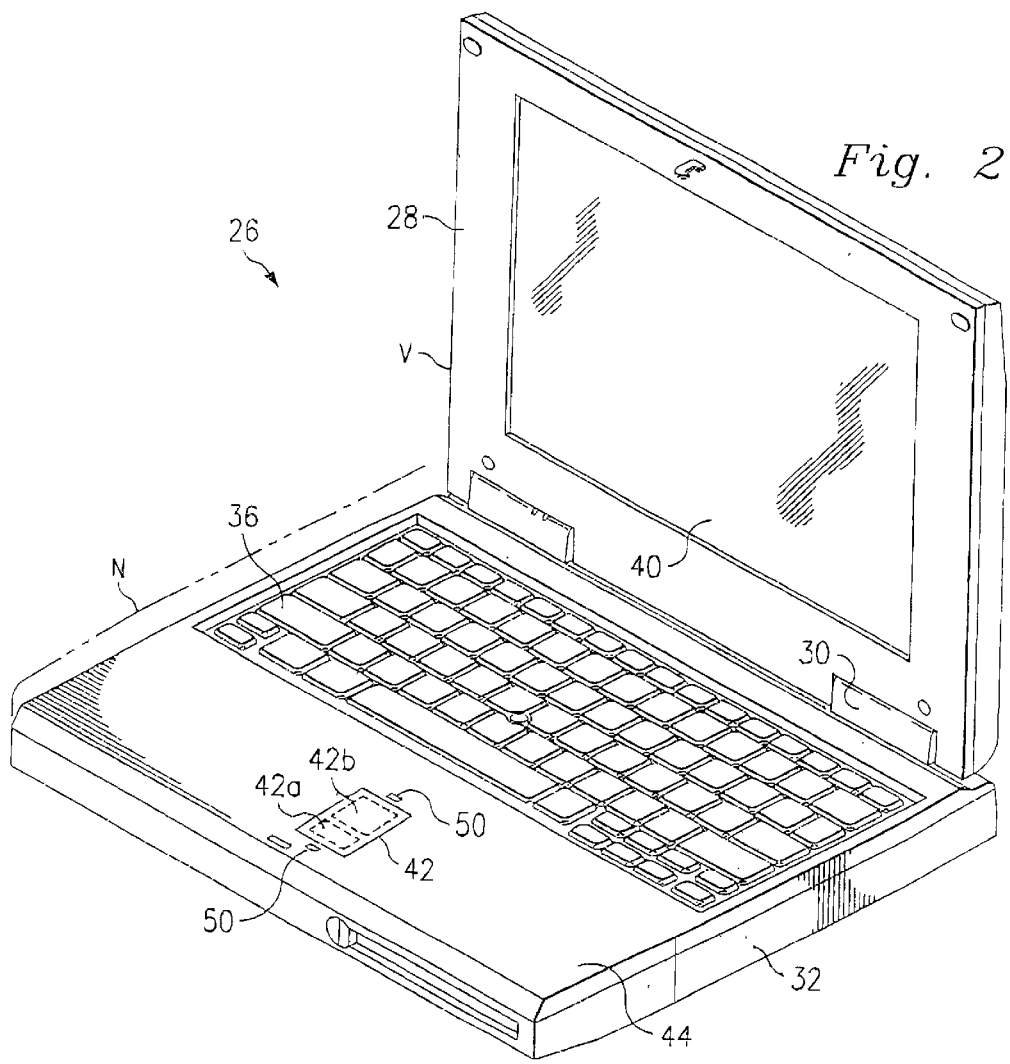
FIG. 2 is an isometric view illustrating an embodiment of a portable computer.

Referring to FIG. 2, illustrated is a portable, notebook size computer designated 26 comprising a self-contained system, such as that illustrated at 10 in FIG. 1, and including a hinged top or lid 28, FIG. 2, rotatable about a hinge or hinges 30, from a nested position N, with a horizontal base 32, to a substantially vertical or open position V. Opening of the notebook computer 26 reveals a plurality of keys 36 on base 32, and a monitor screen 40 mounted in lid or top 28. A touchpad 42 is mounted in a palmrest area 44 adjacent keys 36. Touchpad 42, includes a first portion 42a programmed as usable for button functions to select items on computer display screen 40. Touchpad 42 also includes a second portion 42b usable for cursor movement and placement functions on display screen 40. There is a commercially available software driver that provides a user adjustable scroll region of the touch pad area, whereby the user can touch in this region and perform scroll up and scroll down manipulation. This technique could be easily adaptable to re-allocate the first and second portions 42a, 42b, on the touchpad 42 to include, for example, a three-button configuration, a two-button configuration, or a left, right, bottom or top button configuration.

A touchpad overlay 46, FIGS. 4 and 5, is a panel having a two-bottom button configuration, and may be mounted on touchpad 42 by either inserting a pair of connectors or tabs 48 extending from overlay 46, for detachably mounting overlay 46 into a pair of co-located tab receiving slots 50 on opposite sides of touchpad 42, FIG. 2, or by means of an adhesive layer on a contact surface of touchpad 42, to be discussed below in greater detail. Overlay 46, FIGS. 4 and 5, includes a first or button part having a plurality of defined sections including openings 146a, 146b and includes a second or cursor part having a single defined section including opening 246a. The openings 146a, 146b, 246a are separated from each other.

Figure 3:
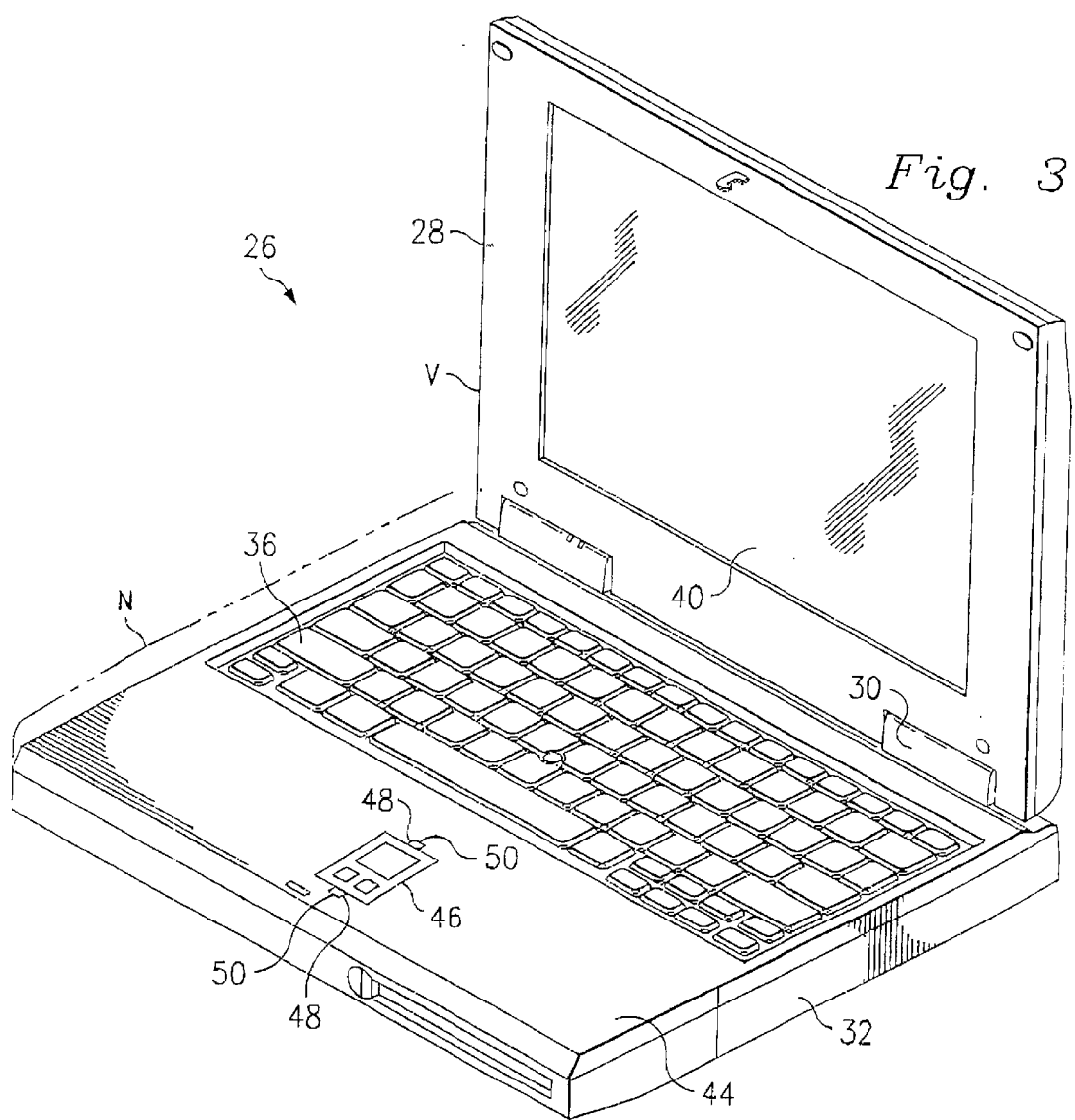
FIG. 3 is another isometric view illustrating an embodiment of a portable computer.

In FIG. 3, touchpad overlay 46 is mounted on touchpad 42. Thus, tabs 48 insert into slots 50 for the above-mentioned detachable mounting. The overlay 46, FIG. 4, includes a keying mechanism 49, which the touchpad 42 detects in a pre-defined location. Software may use the location and a look-up table of pre-defined configurations to auto-configure the software to respond to the keyed overlay 46.

In FIG. 6, an alternative configuration of the overlay is designated 46a, and includes a three-left button configuration having tabs 48 extending from overlay 46a for engagement with the pair of co-located tab receiving slots 50, on opposite sides of touchpad 42, FIG. 2. Overlay 46a, FIG. 6, includes a first or button part having a plurality of sections including openings 346a, 346b, 346c, and includes a second or cursor part having a single defined section including opening 446a. Thus, as described above, tabs 48 insert into slots 50. A keying mechanism 149 is detected by touchpad 42 in a pre-defined location, and the software may be auto-configured to respond to the keyed overlay 46a, so that touchpad 42 conforms to allocating first part 42a to the left side of touchpad 42 for button functions, and second part 42b to the right side of touchpad 42 for cursor movement.

In FIG. 7, an alternative configuration of the touchpad is designated 46b, and includes a three-right button configuration having tabs 48 extending from overlay 46b for engagement with the pair or co-located tab receiving slots 50, on opposite sides of touchpad 42, FIG. 2. Overlay 46b, FIG. 7, includes a first or button part having a plurality of defined sections including openings 546a, 546b, 546c, and includes a second or cursor part having a single defined section including opening 646a. Thus, as described above, tabs 48 insert into the slots 50. A keying mechanism 249 is detected by touchpad 42 in a pre-defined location, and the software may be auto-configured to respond to the keyed overlay 46b, so that touchpad 42 conforms to allocating first portion 42a to the right side of touchpad 42 for button functions, and second portion 42b to the left side of touchpad 42 for cursor movement.

Figure 8:
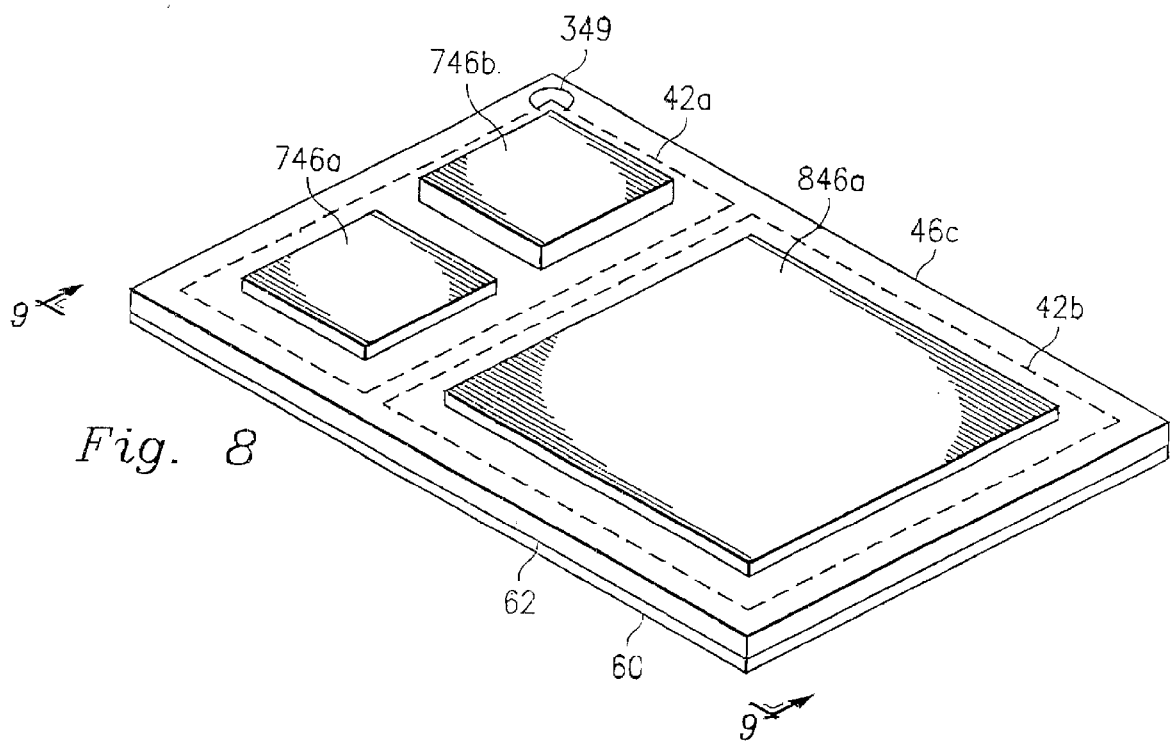
FIG. 8 is an isometric view illustrating a further embodiment of a touchpad overlay.
Figure 9:
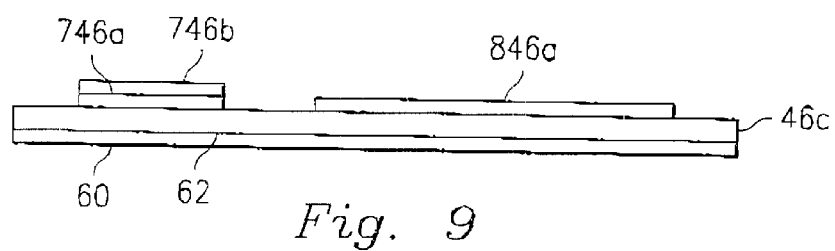
FIG. 9 is a side view of the touchpad overlay taken along the line 9—9 of FIG. 8.

In FIGS. 8 and 9, an alternative configuration of the overlay is designated 46c and includes, for example, a two-top button configuration and a suitable peelable adhesive coating 60 on a contact surface 62 of overlay 46c. Overlay 46c is a solid flexible panel including a plurality of raised surface areas thereon which are of variable height which can be differentiated by feel, i.e. human touch. As such, a single defined section 846a is of a first height and is provided to define a cursor part. A button part includes a plurality of sections 746a and 746b. Section 746a is of a second height, greater than the height of section 846a, and section 746b is of a third height, greater than the height of section 746a. As such, when overlay 46c is adhered to touchpad 42, the single section 846a overlays second part 42b of touchpad 42 for cursor functions, and the plurality of sections 746a and 746b overlay first part 42a of touchpad 42 for button functions. A keying mechanism 349, is detected by touchpad 42 in a pre-defined location, and the software may be auto-configured to respond to the keyed overlay 46c, so that touchpad 42 conforms to allocating first part 42a to the top end of touchpad 42 for button functions, and second part 42b to the bottom end of touchpad 42 for cursor movement.

In FIGS. 10 and 11, an alternative configuration of the overlay is designated 46d and includes, for example, a two-top button configuration and a suitable peelable adhesive coating 160 on a contact surface 162 of overlay 46d. Overlay 46d is a solid flexible panel including a plurality of raised resilient areas formed thereon which are of variable height and which will snap back from a depressed position D, FIG. 11, to a raised position in response to being depressed, thus providing a feel to human touch. As such, a single defined section 1046a is of a first height and is provided to define a cursor part. A button part includes a plurality of sections 946a and 946b. Section 946a is of a dome-like shape having a second height greater than the height of section 1046a, and section 946b is of a third height, greater than the height of section 946a. As such, when overlay 46d is adhered to touchpad 42, the single section 1046a overlays second part 42b of touchpad 42 for cursor functions, and the plurality of sections 946a and 946b overlay first part 42a of touchpad 42 for button functions. Keying mechanism 349, is detected by touchpad 42 in a pre-defined location, and the software may be auto-configured to respond to the keyed overlay 46d, so that touchpad 42 conforms to allocating first part 42a to the top end of touchpad 42 for button functions, and second part 42b to the bottom end of touchpad 42 for cursor movement.

In FIG. 12, an alternative configuration of the overlay is designated 46e and includes, for example, a two-top button configuration and a suitable peelable adhesive coating 260 on a contact surface 262 of overlay 46e. Overlay 46e is a solid flexible panel including a plurality of raised rib members which define sections of overlay 46e and can be differentiated by feel. As such, a single defined section 1246a is defined by rib members 1246b to designate a cursor part. A button part includes a plurality of sections 1146a and 1146b defined by rib members 1146c and 1146d, respectively. As such, when overlay 46e is adhered to touchpad 42, the single section 1246a overlays second part 42b of touchpad 42 for cursor functions, and the plurality of sections 1146a and 1146b overlay first part 42a of touchpad 42 for button functions. Keying mechanism 349, is detected by touchpad 42 in a pre-defined location, and the software may be auto-configured to respond to the keyed overlay 46e, so that touchpad 42 conforms to allocating first part 42a to the top end of touchpad 42 for button functions, and second part 42b to the bottom end of touchpad 42 for cursor movement. Allocation of first part 42a and second part 42b can also be accomplished by selecting a configuration from a list of pre-defined configurations on the screen.

As it can be seen, the principal advantages of these embodiments are that a touchpad-mouse button combination may be re-arranged and configured by a user within a range of versions manufactured into the computer or programmable into the computer by a user. Less parts are required than in conventional mouse button devices. Therefore, original costs, maintenance costs and inventory costs are reduced. Reliability is increased due to the use of fewer parts. The various combinations can be selected to satisfy functional needs or may be a matter of personal preference.

As a result, one embodiment provides a touchpad overlay including an overlay member for mounting on a touchpad. The overlay member has a first part and a second part. The first part of the overlay member includes a plurality of defined sections. The second part of the overlay member includes a single defined section. Means are provided for detachably mounting the overlay member on a touchpad.

Another embodiment provides a touchpad including a first portion which is usable for button functions to select items on a computer display panel. A second portion of the touchpad is usable for cursor movement and placement functions. An overlay member is detachably mounted on the touchpad. The overlay member includes a first part and a second part. The first part of the overlay member includes a plurality of defined sections. The second part of the overlay member includes a single defined section. In this manner, the first part of the overlay member mounts on the first portion of the touchpad and the second part of the overlay members mounts on the second portion of the touchpad.

Still another embodiment provides a computer system including a chassis. A microprocessor is mounted in the chassis. An input device is coupled to provide input to the microprocessor. A mass storage device is coupled to the microprocessor in the chassis. A display is coupled to the microprocessor by a video controller. A memory is coupled to provide storage to facilitate execution of computer programs by the microprocessor in the chassis. A touchpad is mounted on the chassis. A first portion of the touchpad is usable for button functions to select items on a computer display panel. A second portion of the touchpad is usable for cursor movement and placement functions. An overlay member is mounted on the touchpad. The overlay member includes a first part and a second part. The first part of the overlay member includes a plurality of defined sections mounted on the first portion of the touchpad. The second part of the overlay member includes a single defined section mounted on the second portion of the touchpad. Means are provided for detachably mounting the overlay member on the touchpad.

A further embodiment provides a method of sectioning usable areas on a touchpad. The touchpad is configured with a first portion which is usable for button functions to select items on a display panel, and a second portion which is usable for cursor movement and placement functions. An overlay member is formed with a first part and a second part. The first part of the overlay member includes a plurality of defined sections mounted on the first portion of the touchpad. The second part of the overlay member includes a single defined section mounted on the second portion of the touchpad.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed.

What is claimed is:

1. A method of sectioning usable areas on a touchpad for use in a computer system comprising:

providing a chassis;

mounting a microprocessor in the chassis;

mounting a touchpad on the chassis to provide input to the microprocessor;

providing a first portion and a second portion on the touchpad which are user configurable and programmable to provide button functions and cursor functions;

configuring the first portion of the touchpad to be usable for button functions to select items on a computer display panel;

configuring the second portion of the touchpad to be usable for cursor movement and placement functions;

providing an overlay member corresponding to the touchpad such that the overlay member includes a first part and a second part, the first part of the overlay member including a plurality of defined button sections overlaying the first portion of the touchpad, and the second part of the overlay member including a single defined cursor section overlaying the second portion of the touchpad; and mounting the overlay member on the touchpad.

2. The method as defined in claim 1 further comprising detachably mounting the overlay member on the touchpad.

3. The method as defined in claim 2 further comprising providing the overlay member with connectors extending therefrom for detachably mounting the overlay member on the touchpad.

4. The method as defined in claim 2 further comprising providing the overlay member with an adhesive layer for detachably mounting the overlay member on the touchpad.

* * * * *